Oct. 24, 1961   A. R. BAIRD ET AL   3,005,384
POWER ACTUATED REAR VIEW MIRROR
Filed Aug. 17, 1960   2 Sheets-Sheet 1
FIG. 1
FIG. 4
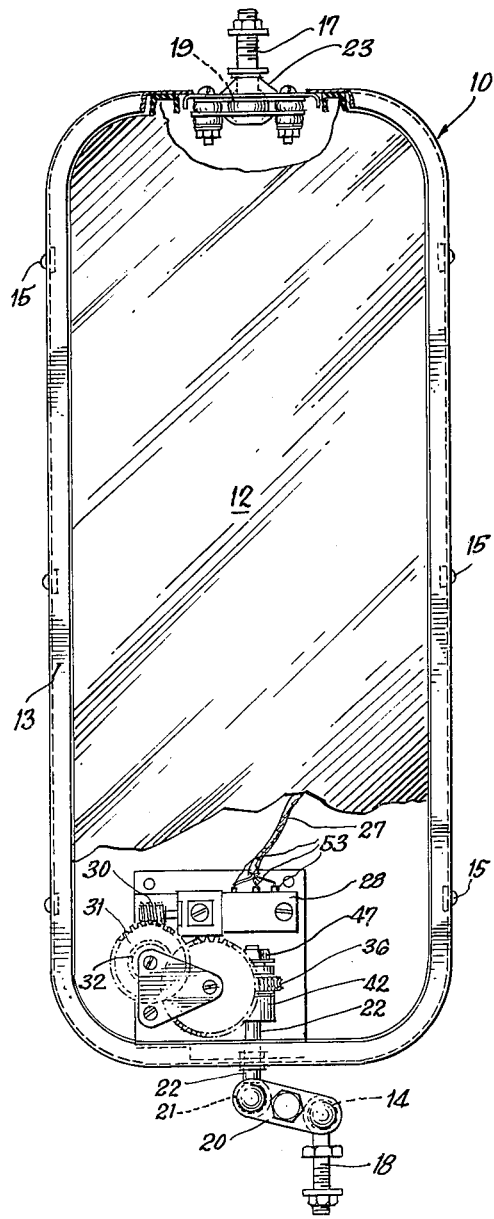
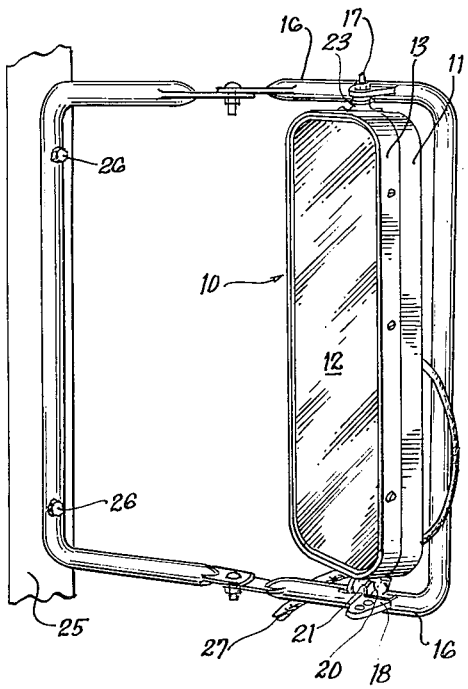
INVENTORS
Ansyl R. Baird
Delbert C. Balagna
BY
Horton, Davis, Brewer & Brugman
Attorneys

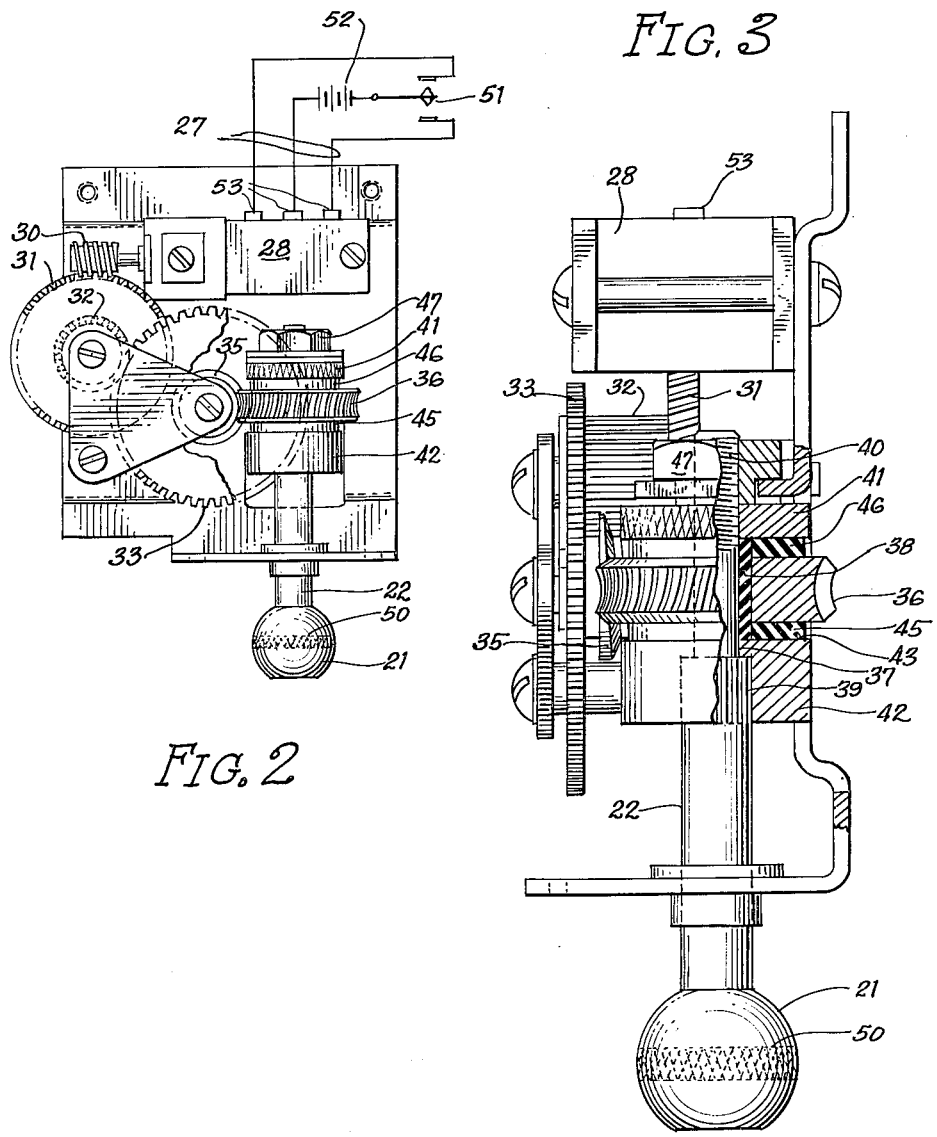

3,005,384
POWER ACTUATED REAR VIEW MIRROR

Ansyl R. Baird, Springfield, Ill., and Delbert C. Balagna, Kansas City, Mo., assignors to Royal Engineering Co., Inc., Pleasant Plains, Ill., a corporation of Illinois
Filed Aug. 17, 1960, Ser. No. 50,104
4 Claims. (Cl. 88—98)

This invention relates to a power mirror and particularly to a motor driven side view mirror for use with automotive vehicles.

In the operation of automotive vehicles, particularly trucks, an operator must view the road behind the vehicle by observation through mirrors on one or both sides of the vehicle. The mirror on the right side of the vehicle is too remote from the driver's position to be adjusted by him while he is in driving position. On large trucks, the same situation is true even of the mirrors on the left side of the vehicle. It is an object of this invention to provide a power driven mirror that can be adjusted from the driver's position even though the mirror is located remote from it.

Some cargo vehicles consist of a trailer and a tractor with the trailer connected pivotally to the tractor. When vehicles of this construction are travelling on a straight road, their drivers can employ mirrors in fixed position to view the road behind. However, when the tractor and trailer are not aligned, as when a truck is turned sharply maneuvering into a tight space or backing toward a loading platform, the mirrors connected to the tractor do not give the operator a view of the rear of the trailer, which is the critical area. For example, when backing toward a loading dock the trailer and tractor are out of alignment and the mirrors on opposite sides of the truck will provide the driver only a view of the side wall of the trailer through one mirror and a view of the area far to the side of the trailer through the other while the back of the trailer is obscured from his view. Since a view of the rear of the trailer is most important during such maneuvers, ordinary mirrors are inadequate for this most important use. It is another object of this invention to provide a power mirror that may be turned in both directions through a wide angle thereby providing means for a driver to view the rear portion of his vehicle in all positions in which it might be.

Mirrors on trucks are usually mounted on U-shaped or square brackets that are connected to the door post of the cab. The brackets are mounted with the mirrors connected between the horizontal legs extending from the cab. This mounting fixes the vertical axis of the mirror so that rotation about that axis is all that is required for adjustment. Mirrors and brackets necessarily protrude beyond the side of the vehicle in order to present a view of the rear and as a result of such placement these elements are vulnerable to being bumped. The brackets also offer convenient hand holds for persons entering and leaving the cab and as a result the brackets frequently are bent so that the top and bottom pivots on which the mirror rotates are out of alignment. Misalignment of these pivots causes rotation of the mirror to be so difficult that ordinary power mirrors cease to function when their brackets are bent. It is another object of this invention to provide a power mirror that maintains top and bottom pivotal connections in axial alignment even when the holding bracket is bent or distorted from its regular shape.

To avoid unwieldly and expensive construction, a power mirror desirably has its prime mover contained within the mirror housing. Therefore, the prime mover must be small in order to be contained in a reasonably sized mirror and as such it will have limited power. The low powered prime mover operates a speed-reducing gear train which is correspondingly small. As heretofore stated, the mirrors are positioned to be vulnerable to abuse and such abuse will destroy the relatively delicate gear train employed to drive the mirror. It is another object of this invention to provide a power mirror having a prime mover and power transmission means that is contained within the mirror housing and insulated from damage due to impact or other misuse of the mirror.

These and other objects are obtained by the present invention which is a power mirror that is capable of being adjusted from a remote operating station by a reversible electric motor or equivalent prime mover. The mirror of this invention consists of a mirror-holding housing which contains the prime mover and the power transmitting mechanism within the housing having a wire connecting to an energy source as the only external connection. The mirror housing is held between upper and lower axially aligned members. One of these is pivotally connected to a conventional bracket and the other one is the axle upon which the power mechanism rotates. The axle-pivot member is secured to the holding bracket by a floating universal joint consisting of a ball-acting joint which in turn is connected through a double socket means to another ball-acting joint, which is in turn secured to the bracket. The prime mover is preferably an electric motor that is fastened with bolts or the like to the interior of the housing. A reducing gear train connects the motor to a gear that encircles and is free floating with respect to the axle-pivot hereinabove described and this free floating gear is held stationary relative to the axle-pivot member by an adjustable clutch. The clutch is adjusted to be slidable when the housing is subjected to any force great enough to damage the gear train or the prime mover.

A desirable embodiment of our invention is shown in the accompanying drawings in which:

FIG. 1 is a partly cut-away front view embodying this invention;

FIG. 2 is a partly cut-away, partly schematic front view of a drive mechanism suitable for use in this invention;

FIG. 3 is a partial sectional view from the right side of FIG. 2; and

FIG. 4 is a perspective view of the mirror of FIG. 1 as mounted on a bracket which is in turn mounted on a vehicle.

The mirror assembly 10 consists generally of a hollow metal housing 11 and a mirror 12 which forms a front closure to the housing. It is held in place with a frame 13 which is shown overlapping the mirror on the front and connected to the housing with screws 15. The mirror assembly 10 is held at the top and bottom to a bracket 16 by an upper connector 17 and a lower connector 18 both of which fasten to the bracket with threaded bolt-like elements. In the embodiment shown both of the connectors 17 and 18, on the end opposite the threaded end, terminate in a ball-acting member. A ball-acting member is herein defined as an element which is at least partly in the form of a spherical surface that is capable of rotating universally in an accommodating socket. These members are usually spherical except where the shank portion extends from them, however, they may be truncated to any extent. In the embodiment illustrated the ball-acting member 14 of lower connector 18 is received in a double socket member 20 which embraces another ball-acting member 21 in the other socket. The ball-acting member 21 is the terminal portion of an axle-pivot member 22 which forms both a pivot upon which the mirror rotates and an axle against which the power mechanism exerts force. The ball-acting member 19 of the upper pivot 17 is pivotally embraced in a single socket member 23 to provide both limited universal action and free rotation between these two elements. The upper connector 17 preferably terminates in a ball-acting element to provide desirable universal motion, but employing an ordinary axle and bearing for connecting connector 17 to the housing 11 is contemplated as an embodiment of this invention. The mirror assembly may be employed upside down to the position shown so that the axle-pivot member forms the upper connection of the mirror to the bracket 16 without affecting the operation in any way.

As best illustrated in FIG. 4 the mirror assembly 10 is connected between the upper and lower arms of a bracket 16 which in turn is connected to the door post 25 or an equivalent member of an automotive vehicle. The connection is shown here with bolts 26 which hold the bracket in a vertical plane with arms extending horizontally sufficiently far from the cab or body to give the driver a view of the road behind. An energy supply means such as wire 27 enters the rear of housing 11 to supply energy to the prime mover. The upper and lower arms of bracket 16 are spaced to permit 360° rotation of the mirror assembly 10.

A prime mover 28 is fastened to the rear wall of the housing 11. Although the prime mover may be a hydraulically or pneumatically operated motor, it is preferably a reversible electric motor.

Since it is desirable to drive the mirror slowly, and to increase the mechanical advantage of the small prime mover, a speed reduction gear train is employed. The prime mover 28 drives a worm gear 30 which in turn drives a transmission gear 31 which is coaxial with a pinion gear 32. The pinion gear 32 drives another large transmission gear 33 which is coaxial with a worm gear 35. The worm gear 35 is engaged with an axle gear 36 which is fixed to be stationary with respect to the axle-pivot 22 as hereafter described. This gear train preferably reduces the prime mover speed to produce a mirror rotation rate of from about 1 to about 5 r.p.m.

The axle gear 36 encircles an upper laterally contracted portion 37 of axle-pivot 22 and is spaced from it with a bushing or gear spacer 38. The end of the laterally contracted portion 38 is threaded with threads 40 suitable to receive a knurled nut 41. The portion of the axle-pivot adjacent the laterally contracted portion is splined or knurled as at 39, to provide a slip free fit with a collar 42 which is bored part way through substantially the same diameter as the enlarged portion of axle-pivot 22 and bored coaxially with that bore substantially the size of the contracted portion 37. The collar 42 slips over the top of the axle-pivot and engages the splines 39 so that there is no relative rotation between the collar and the axle, and large shoulder 43 is in a plane perpendicular to the axis of the axle-pivot 22.

A clutch element 45 is interposed to be in contact with the shoulder 43 and the lower face of axle gear 36. A second clutch element 46 is interposed between the upper face of axle gear 36 and the lower face of knurled nut 41. This structure provides an axle gear 36 that is free floating with respect to the axle-pivot 22 but which is held by the clutch elements to be stationary with respect to the axle-pivot member. By varying the pressure exerted by knurled nut 41 against the clutch element 46, the clutch assembly is adjustable to provide slippage when a predetermined torque is exerted between the gear 36 and the axle 22. To maintain the desired adjustment, a lock nut 47 is employed to jam knurled nut 41 in its set position.

The structure as described hereinabove provides a remotely adjustable side view mirror that is immune from the influences that generally are destructive of such devices. To operate the mirror a switch 51 that is readily accessible from the driver's position is connected between prime mover 28 and a source of electricity 52. The switch preferably is a double pole switch that is capable of providing energy to the prime mover 28 to different terminals by suitable connection between the source and the terminals 53 of the motor. When it is desired to adjust the mirror, the switch 51 is closed in one direction or another thereby actuating the prime mover 28 which turns through the gear train hereinbefore described. The worm gear 35 rotates while it is engaged with the axle gear 36. Since the axle gear 36 is fixed relative to axle-pivot member 32, the mirror will rotate around the vertical axis formed between pivot 23 and pivot 48 where the housing is connected to the axle-pivot. When the mirror is at the desired position releasing the switch to open the circuit will stop rotation.

In the event that the bracket 16 becomes distorted, the structure of this invention is such that the axial alignment of the axle-pivot 22 and the upper connector 17 is not disturbed. Preservation of this axial alignment is effected by the combination of a fixed universal pivotal connector 17 and a floating universal pivotal connector that is formed by the coaction of the ball-acting member 21, the bottom connector 18 and the double socket member 20. If the bracket 16 is bent, for example, by having its lower arm pushed forward or backward with respect to the vehicle, connector 18, which is fixed to the lower bracket arm, will rotate around the axle-pivot 22 so that the position of lower connector 18 and the position of double socket 20 will change with respect to the vehicle but the position of axle-pivot 22 will remain stationary and in axial alignment with the top connector 17. Even if the ball-acting member 21 does move slightly, the universal motion of connector 17 will preserve axial alignment. Similarly, if the bracket 16 is distorted so that the lower arm is bent up or down, then the ball-acting member 21 will remain in its original position and only connector 18 will move up or down acting through the double socket 20. It is evident that the combination is equally capable of compensating for distortions combining vertical and horizontal bends in the bracket 16 without disturbing the alignment between axle-pivot 22 and connector 17 thereby preserving the ability of the low-power prime mover 28 to drive the mirror. It may be desirable to place a light knurl 50 around the spherical surface of the ball-acting member 21 to provide resistance to unwanted slippage.

In the event that the mirror assembly 10 is subjected to a violent torque such as when forcibly adjusted by hand rather than by the prime mover or when bumped while the vehicle is in motion, the structure herein described prevents damage to the mechanical portion of the mirror assembly. As hereinbefore stated the clutch that holds the axle gear stationary relative to the axle-pivot member is adjustable so that any force or torque great enough to damage the gear train or prime mover will cause slippage between the axle gear 36 and the axle-pivot member 22. The clutch, which is composed of clutch elements 45 and 46, knurled nut 41 and collar 42 is adjusted to be tight enough only to resist turning of axle gear 36 when the prime mover is actuated. In other words, as long as the clutch resists an amount of force greater than the force required to overcome the resistance of pivots 23 and 48, operation of prime mover 28 will cause the mirror assembly to rotate rather than causing slippage of the axle-gear 36 on the axle 22. It is therefore evident that extremely wide ranges of predetermined clutch settings will prevent damage to the mirror assembly and that the settings of the clutch are not confined to a small, difficult to maintain range to provide the safety factor of this invention.

From the foregoing description it is seen that this invention provides a mirror that is adjustable from a remote operating station to give a driver a view of any area within 360° of rotation. The mirror, by being connected to the bracket through a floating universal connector, is maintained with its pivots axial and properly spaced regardless of the abuse that the mirror or its bracket receives. Furthermore, the mirror of this invention is readily adjusted to provide clutch slippage which insulates the relatively delicate shielded and concealed driving mechanism from abuse.

Having thus described our invention, what is claimed is:

1. A remotely positionable side view mirror for use with an automotive vehicle which comprises in combination an enclosed housing having said mirror forming one face thereof, a reversible electric motor connected within said housing, first means extending from one side of said housing for connecting said housing to a holding bracket, said first means forming a pivotal connection between said housing and said connector, an axle pivotally connected from an intermediate portion thereof to said housing with the portion of said axle extending out of said housing terminating in a ball-acting member, the portion extending into said housing secured to a driving gear and said driving gear forming the terminal gear of a speed reducing gear train connecting said driving gear to said motor, a second means for connecting to a holding bracket, said second means terminating at one end in a bracket engaging member and at the other end in a ball-acting member, a double socket member embracing in one socket the ball-acting member of said second bracket engaging member, and in the other socket the ball-acting member of the axle, a wire extending from said motor to an energy source and to the remote operating position, and a switch at said remote position for operating said motor in both directions of rotation.

2. A remotely positionable side view mirror for use with an automotive vehicle which comprises in combination an enclosed housing having said mirror forming one face thereof, a reversible electric motor connected within said housing, first means for connecting said housing to a holding bracket extending from one side of said housing and pivotally connected to said housing, an axle pivotally connected to said housing from a medial portion of said axle, said axle extending from said housing from the side opposite said first means, axially with said first means and terminating in a ball-acting member, said axle extending into said housing and connecting through a friction clutch to a driving gear which is held by said clutch to be stationary relative to said axle, a reducing gear train connecting said motor to said driving gear, a second means for connecting to a holding bracket, said second means terminating in a ball-acting member, a double socket means embracing the ball on said axle in one socket and the ball on said second means in the other socket, a wire extending from said motor to an energy source and to the remote operating position and a switch at said remote position for operating said motor in both directions of rotation.

3. A remotely positionable side view mirror for use with an automotive vehicle which comprises in combination an enclosed housing having said mirror forming one face thereof, a reversible electric motor connected within said housing, first means for connecting said housing to a holding bracket extending from one side of said housing and pivotally connected through a ball-acting member to said housing to provide universal connection to said housing, an axle pivotally connected to said housing from a medial portion of said axle, said axle extending from said housing from the side opposite said first means, axially with said first means and terminating in a ball-acting member, said axle extending into said housing and connecting through a friction clutch to a driving gear which is held by said clutch to be stationary relative to said axle, a reducing gear train connecting said motor to said driving gear, a second means for connecting to a holding bracket, said second means terminating in a ball-acting member, a double socket means embracing the ball on said axle in one socket and the ball on said second means in the other socket, a wire extending from said motor to an energy source and to the remote operating position and a switch at said remote position for operating said motor in both directions of rotation.

4. The mirror assembly of claim 1 further characterized in that said assembly is held by a bracket said first means is connected to the upper arm of said holding bracket, said second means is connected to the lower arm of said holding bracket, said bracket is fixed to a vehicle with said upper and lower arms parallel, vertically disposed relative to each other and spaced to permit 360° rotation of said mirror assembly.

No references cited.